Sept. 6, 1966  D. ENGELSMANN  3,270,648
OBJECTIVE ASSEMBLY FOR PHOTOGRAPHING DEVICES
Filed June 10, 1964
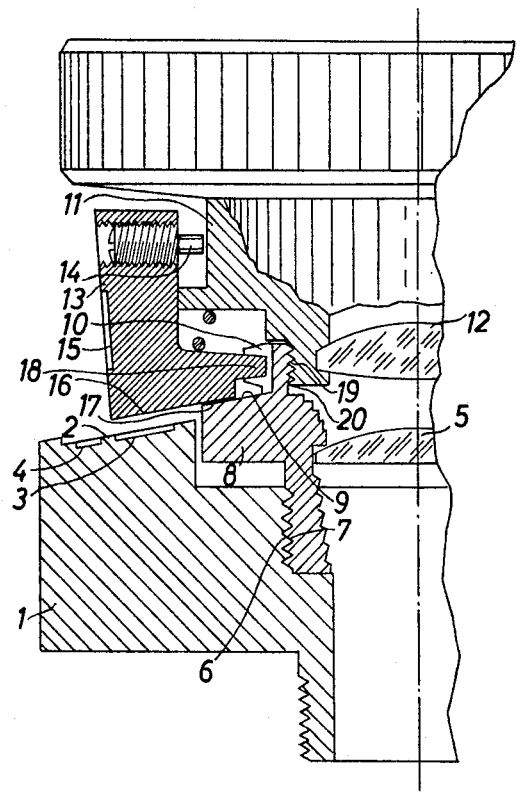
INVENTOR.
DIETER ENGELSMANN
BY
Michael J. Striker an objective assembly, a main objective means which has its own distance scale for adjusting the main objective means, and an auxiliary objective means detachably connected with the main objective means and covering the scale of the latter, the auxiliary objective means itself carrying a distance scale for the combined assembly cooperating with a suitable index carried by the main objective means for setting the combined assembly.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing, in which one possible structure according to the present invention is fragmentarily illustrated in a longitudinal partly sectional view.

United States Patent Office 3,270,648
Patented Sept. 6, 1966

3,270,648
OBJECTIVE ASSEMBLY FOR PHOTOGRAPHING DEVICES
Dieter Engelsmann, Unterhaching, Munich, Germany, assignor to Agfa Aktiengesellschaft, Leverkusen, Germany
Filed June 10, 1964, Ser. No. 374,092
Claims priority, application Germany, June 14, 1963, A 20,131
10 Claims. (Cl. 95—45)

The present invention relates to photographic devices and in particular to objective assemblies of photographic devices.

The present invention is specially concerned with objective assemblies where a main objective which is permanently connected with a photographic device is adapted to have detachably connected thereto an auxiliary objective which is situated in front of the main objective and preferably includes an afocal optical system. In this way, the auxiliary and main objectives form a combined objective assembly and the combined objective assembly is conventionally adjusted in a manner similar to any objective.

Although assemblies of this general type are well known, they include certain disadvantages. Thus, when the auxiliary objective is not connected with the main objective, the latter functions by itself and, of course, must have its own scale of distance in order to enable the main objective to be set in order to focus on a given subject. On the other hand, when the auxiliary objective is attached to the main objective so as to form the combined objective assembly therewith, it is necessary to make available to the operator a completely different scale of distance which may be used for proper focusing of the combined objective assembly, and up to the present time the problem of providing these different scales in a convenient foolproof manner has not been solved. For example, there are certain known devices where in order to avoid improper connection of the auxiliary objective to the main objective it is essential that the main objective be first set at its infinite position before the auxiliary objective is attached thereto, and, of course, this requirement is a great inconvenience and very often will be overlooked, particularly by the amateur, so that improper operation with the combined objective assembly will result.

A primary object of the present invention, therefor, is to provide a combined objective assembly having a detachable auxiliary objective and a main objective, but which avoids the above drawbacks.

Thus, the objects of the invention include a combined assembly where the auxiliary objective can be connected to the main objective in any setting of the latter, not necessarily the infinite setting thereof, without in any way undesirably influencing the operation of the combined objective assembly.

A further object of the present invention is to provide a combined objective assembly where the distance scale for the main assembly when the latter is used by itself provides a simple, uncomplicated, immediately obvious manner of setting the main objective, while when the auxiliary objective is attached to the main objective the distance scale of the latter is automatically rendered ineffective while at the same time without any particular attention on the part of the operator there is only one distance scale and index visible to the operator for setting the combined assembly.

It is furthermore an object of the present invention to provide an exceedingly simple and rugged structure capable of accomplishing the above objects and operating in a foolproof manner.

With these objects in view, the invention includes, in an objective assembly, a main objective means which has Referring now to the drawing, there is shown therein a main objective means which includes a stationary outer annular part 1 which is fixed permanently with the photographic device, which may be a still or motion picture camera, and this part 1 while having a rear tubular threaded portion so that it can be mounted on the housing of the camera may, if desired, form an integral part of the camera housing. The stationary part 1 of the main objective means has a forwardly directed annular surface 2 surrounding the optical axis and located almost in a plane normal to the optical axis. In the actual construction illustrated this surface 2 has a frustoconical configuration and forms part of a cone which has a very large apex angle closely approaching 180°. This forwardly directed annular surface 2 carries the distance scale 3 used for setting the main objective means so that it can be focused on a given subject, and in addition the stationary surface 2 carries an index 4 which since it does not move relative to the scale 3 obviously can not cooperate therewith and thus is of no significance when the main objective means is used by itself. The main objective means includes a lens system 5 shown as including but a single lens for the sake of simplicity of illustration of the invention, and the lens 5 is carried by a lens carrier 8 in the form of a tubular member of the main objective means capable of being axially displaced relative to the stationary part 1 of the main objective means for adjusting the main objective means. In the particular example illustrated the inner member 8 of the main objective means has at its rear tubular portion an outer thread 7 received in an inner thread 6 of the stationary part 1, and the threads 6, 7 having a suitable pitch which in response to turning of the member 8 relative to the member 1 will axially displace the main objective lens 5 so as to adjust the main objective means. The turnable lens carrier 8 carries an index 9 which cooperates with the scale 3 so that it is possible to set the main objective means 1–9 at a setting which will provide on the unillustrated focal plane a sharp image of a subject located at a distance from the photographic device indicated by the graduation of the scale 3 with which the index 9 is aligned.

The main objective means further includes a front portion 10 in the form of an annular flange, and this front portion 10 is formed with a radial notch having an outer open end for a purpose described below. The section of the drawing is taken through this notch of the front portion 10 of the main objective means.

The auxiliary objective means of the invention includes an inner annular lens carrier 11 which carries the lens 12 of the auxiliary objective means. In addition the auxiliary objective means includes a freely turnable outer annular member 13 which is centered with respect to the lens carrier 11 but which can turn freely with respect thereto about the optical axis. The forward portion of the annular member 13 carries a plurality of screw members 1 uniformly distributed about the optical axis and capable of being turned with respect to the member 13 for centering the latter with respect to the lens carrier 11. This freely turnable member 13 has an outer substantially cylindrical surface forming an exterior surface of the auxiliary objective means which carries a distance scale 1 having graduations which are designed for proper setting of the combined objective assembly shown in the drawing. When the auxiliary objective means is connected with the main objective means, as shown in the drawing, the member 13 covers the scale 3 so that the latter cannot enter into the adjustment of the combined objective assembly. Thus, the outer exterior surface of member 13 which carries the scale 15 is located from the optical axis at a radial distance which is at least as great as the radial distance at which the outer periphery of the scale 3 is located from the optical axis, so that as a result when the auxiliary objective means is connected with the main objective means the scale 3 will necessarily be covered. It will be noted that the member 13 has a rearwardly directed annular surface 16 of substantially the same inclination as and located adjacent to the surface 2 which carries the scale 3. This rearwardly directed surface 16 directly engages the forwardly directed surface 17 of the member 8 so that, of course, the index 9 is also covered, and these surfaces 16 and 17 which engage each other are of the same inclination. An inner portion of the member 13 is provided with an inwardly radial projection 18 which is received in the radial notch of the front annular portion 10 of the main objective means.

A means is provided for detachably connecting the auxiliary objective means with the main objective means, and this latter means for connecting the pair of objective means in the illustrated example includes an outer thread 19 at a rear exterior portion of the lens carrier 11 received in an inner thread 20 at the tubular front portion of the inner member 8 which is provided with the outwardly directed flange 10. When the auxiliary objective means is connected to the main objective means the lens carrier 11 threads into the lens carrier 8 until the surfaces 16 and 17 press tightly against each other. However, the threading of the carrier 11 into the carrier 8 is only possible when the projection 18, at the beginning of the connection of the auxiliary objective to the main objective, is aligned with and capable of being received in the notch of the member 10. Thus, if the projection 18 should engage the front surface of the flange 10 at a part thereof displaced from the notch or cutout therein, the operator will not be able to connect the auxiliary objective with the main objective. It is only when the projection 18 is angularly aligned with the notch of the flange 10 that it is possible to connect the auxiliary objective to the main objective, and, of course, the free turnability of the member 13 relative to the member 11 makes it very easy to provide the angular alignment of the projection 18 and the notch of the flange 10. The result of the necessary alignment of the projection 18 with the notch of the member 10 is that when the auxiliary objective is connected to the main objective the scale 15 will necessarily have a angular position determined by the angular position of the lens carrier 8, and since this latter angular position is indicative of the distance setting of the main objective when the auxiliary objective is attached thereto, the scale 15 will always have a predetermined angular position determined by the particular setting of the main objective.

In order to adjust the combined objective assembly shown in the drawing the operator will turn the member 13 so that the projection 18 transmits the turning of the member 13 to the member 8, and thus during adjustment of the combined objective assembly the main objective lens 5 is axially advanced in precisely the same way as when it is used by itself and there is no movement of the auxiliary object relative to the main objective during adjustment of the combined objective assembly. The only index visible when the auxiliary objective is attached to the main objective is the index 4 which, of course, is stationary and cooperates with the turnable scale 15 for indicating the setting of the combined objective assembly. Since the scale 3 and index 9 are fully covered at this time, they cannot in any way influence the setting of the combined objective assembly.

Of course, certain variations are possible in the above-described embodiment shown in the drawing. For example, instead of providing a threaded connection 19, 20 between the auxiliary and main objectives, a bayonet connection may be used.

It will be understood that each of the elements described above, or two or more together, may also find a useful application in other types of photographic devices differing from the types described above.

While the invention has been illustrated and described as embodied in objective assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An objective assembly for a photographic device comprising, in combination; a camera body; main objective means; first mounting means mounting said main objective means on said camera body movable along a helical path coaxial with the optical axis of said main objective means so that the focal distance of said main objective means may be adjusted by turning of said main objective means; first indicator means located partly on said camera body and partly on said main objective means for indicating the focusing position of said main objective means; auxiliary objective means; second mounting means detachably mounting said auxiliary objective means on said main objective means movable along a path coaxial with said optical axis, said auxiliary objective means when mounted on said main objective means moving together with the same; auxiliary focusing means turnable relative to said auxiliary objective means and having a coupling portion engaging said main objective means in a predetermined angular position relative thereto for rotation together therewith, whereby turning of said auxiliary focusing means will result in movement of said main objective means together with the auxiliary objective means attached thereto along said helical path, focusing the objective assembly composed of said main and auxiliary objective means; and second indicator means located partly on said camera body and partly on said auxiliary focusing means for indicating the focusing position of the combined objective assembly.

2. An assembly as recited in claim 1 and wherein said camera body has a frustoconical surface portion whose axis coincides with the optical axis, and said frustoconical surface carrying the part of the first indicator means located on said camera body, said auxiliary focusing means also having a frustoconical surface which is located adjacent and overlaps at least that portion of said frustoconical surface of said camera body which carries said part of said first indicator means for covering the latter.

3. An assembly as recited in claim 2 and wherein said frustoconical surfaces are almost at right angles to the optical axis.

4. An objective assembly for a photographic device comprising main objective means adapted to be permanently connected with the photographic device and having a forwardly directed angular surface surrounding the optical axis and carrying a scale of distances for setting said main objective means; auxiliary objective means located in front of and coaxially aligned with said main objective means to form a combined objective assembly therewith, said auxiliary objective means having a rearwardly directed annular surface surrounding the optical axis and covering said scale, and said auxiliary objective means having an exterior circular surface visible to the operator and carrying a distance scale for the combined objective assembly; means detachably connecting said auxiliary objective means so that when said auxiliary objective means is disconnected from said main objective means said distance scale of said main objective means is uncovered; and an index carried by said main objective means outwardly beyond said scale of said main objective means and cooperating with said scale carried by said exterior surface of said auxiliary objective means to cooperate with the latter scale for setting the combined objective assembly, and said main objective means carrying a second index located inwardly of said scale of said main objective means to cooperate with the latter when said auxiliary objective means is detached from said main objective means.

5. An assembly as recited in claim 4 and wherein said main objective means has an outer stationary portion turnable relative to said stationary portion during adjustment of said main objective means, said second index being carried by said turnable inner portion of said main objective means and said distance scale of said main objective means and said first-mentioned index being carried by said outer stationary portion of said main objective means, said auxiliary means when connected to said main means being turnable together with the latter for adjusting the combined assembly and turning the scale of said auxiliary means with respect to the first-mentioned index.

6. An assembly as recited in claim 1 and wherein said main objective means includes a coupling portion adapted to engage the coupling portion of said auxiliary focusing means, one of said coupling portions being formed with a cutout and the other thereof including a portion which extends into said cutout.

7. An assembly as recited in claim 6 and wherein said main objective means has said coupling portion formed with said cutout and said cutout being an outwardly directed radial notch, said coupling portion of said auxiliary focusing means being an inwardly directed radial projection received in said notch.

8. An assembly according to claim 1, wherein said auxiliary focusing means includes an outer annular member surrounding and freely turnably carried by said auxiliary objective means, said annular member having an exterior surface carrying a distance scale for the combined objective assembly, said scale constituting a part of said second indicator means, said camera body carrying an index constituting the other part of said second indicator means and cooperating with said scale carried by said annular member when said auxiliary objective means is connected with said main objective means.

9. An objective assembly according to claim 1, wherein said auxiliary focusing means is freely turnably attached to said auxiliary objective means.

10. An objective assembly according to claim 1, wherein said first mounting means mounting said main objective means on said camera body includes a pair of mating threaded portions respectively located on said main objective means and on said camera body, said second mounting means including a pair of mating threaded portions respectively located on said auxiliary objective means and on said main objective means, all of said threaded portions being coaxial with the optical axis of said main objective means.

References Cited by the Examiner
UNITED STATES PATENTS

| | | | |
|---|---|---|---|
| 2,926,579 | 3/1960 | Gebele | 95—45 |
| 2,995,074 | 8/1961 | Schmuck | 95—45 |
| 3,012,491 | 12/1961 | Malek | 95—45 |

JOHN M. HORAN, *Primary Examiner.*